United States Patent
Uhrner et al.

(10) Patent No.: US 8,181,971 B2
(45) Date of Patent: May 22, 2012

(54) SEALING RING

(75) Inventors: Klaus-Jürgen Uhrner, Leingarten (DE); Herbert Gust, Freilberg (DE)

(73) Assignee: KACO GmbH & Co. KG, Heilbronn (DE)

(*) Notice: Subject to any disclaimer, the term of this patent is extended or adjusted under 35 U.S.C. 154(b) by 95 days.

(21) Appl. No.: 12/209,223

(22) Filed: Sep. 12, 2008

(65) Prior Publication Data
US 2009/0072489 A1 Mar. 19, 2009

(30) Foreign Application Priority Data
Sep. 13, 2007 (DE) .................... 10 2007 045 043

(51) Int. Cl.
*F16J 15/32* (2006.01)
(52) U.S. Cl. .................... 277/559; 277/560
(58) Field of Classification Search ............ 277/549, 277/559, 552, 560
See application file for complete search history.

(56) References Cited

U.S. PATENT DOCUMENTS

| | | | | |
|---|---|---|---|---|
| 3,929,340 A * | 12/1975 | Peisker | ................ | 277/559 |
| 4,427,205 A * | 1/1984 | Holzer et al. | ................ | 277/559 |
| 4,440,405 A * | 4/1984 | Schaus et al. | ................ | 277/559 |
| 4,591,168 A * | 5/1986 | Holzer | ................ | 277/309 |
| 4,695,063 A * | 9/1987 | Schmitt et al. | ................ | 277/559 |
| 4,739,998 A * | 4/1988 | Steusloff et al. | ................ | 277/309 |
| 5,271,629 A * | 12/1993 | Dahlhaus et al. | ................ | 277/559 |
| 5,427,387 A * | 6/1995 | Johnston | ................ | 277/559 |
| 5,791,658 A * | 8/1998 | Johnston | ................ | 277/559 |
| 5,921,555 A * | 7/1999 | Johnston | ................ | 277/559 |
| 6,715,768 B1 * | 4/2004 | Bock et al. | ................ | 277/559 |
| 2003/0085527 A1 | 5/2003 | Hacker et al. | | |
| 2004/0227304 A1 | 11/2004 | Kern et al. | | |

FOREIGN PATENT DOCUMENTS
EP 0413895 A1 2/1991
* cited by examiner

*Primary Examiner* — Alison Pickard
(74) *Attorney, Agent, or Firm* — Gudrun E. Huckett

(57) ABSTRACT

A sealing ring has a sealing element with at least one fastening part and at least one sealing part provided with a sealing edge. The sealing element is essentially of rotational symmetry. The sealing edge, at least over a portion of a circumference thereof, is positioned in a slanted position relative to a seal axis at an angle different from a 90 degree angle, viewed in a projection onto an axial plane of the sealing ring.

5 Claims, 8 Drawing Sheets

SEALING RING

BACKGROUND OF THE INVENTION

The invention relates to a sealing ring comprising a sealing element that comprises at least one fastening part and at least one sealing part provided with a sealing edge.

Sealing rings rest with the sealing edge of their sealing part on the shaft to be sealed. In use, the medium to be sealed leaks and reaches the area underneath the sealing part. In order to return the medium to the medium side to be sealed, it is known to provide return devices, for example, in the form of return threads or spirals, on the inner side of the sealing part. Their manufacture is however complex and expensive.

It is therefore an object of the present invention to design a sealing ring of the aforementioned kind in such a way that a return conveying action of the medium that is to be sealed and that has leaked underneath the sealing part can be ensured in a simple way in both directions of rotation of the machine part to be sealed.

SUMMARY OF THE INVENTION

In accordance with the present invention, this is achieved in that the sealing element essentially has a shape of rotational symmetry and in that the sealing edge, at least over a portion of its circumference, viewed in a projection onto an axial plane of the sealing ring, is positioned relative to the seal axis at an angle deviating from 90 degrees.

In the sealing ring according to the invention the sealing edge is positioned at an angle that deviates from 90 degrees relative to the seal axis at least over a portion of its circumference, when it is viewed in a projection onto an axial plane of the sealing ring. Because of this slanted position of the sealing edge, a return conveying effect is exerted in a simple way onto the medium to be sealed that has leaked underneath the sealing part. In this way, return devices that require a complex manufacture are no longer needed. Since the sealing element moreover is substantially of rotational symmetry, the sealing ring can be produced inexpensively and in a simple way. The slanted position of the sealing edge has the result that in use of the sealing ring a return conveying action for the medium to be sealed is realized in both rotational directions of the machine part to be sealed.

In a simple embodiment, the sealing element is mounted directly in the mounting space at the location provided for this purpose.

In another embodiment, the sealing element is fastened in a housing that, in turn, is inserted into the mounting space.

DESCRIPTION OF THE PREFERRED EMBODIMENTS

Figure 1:
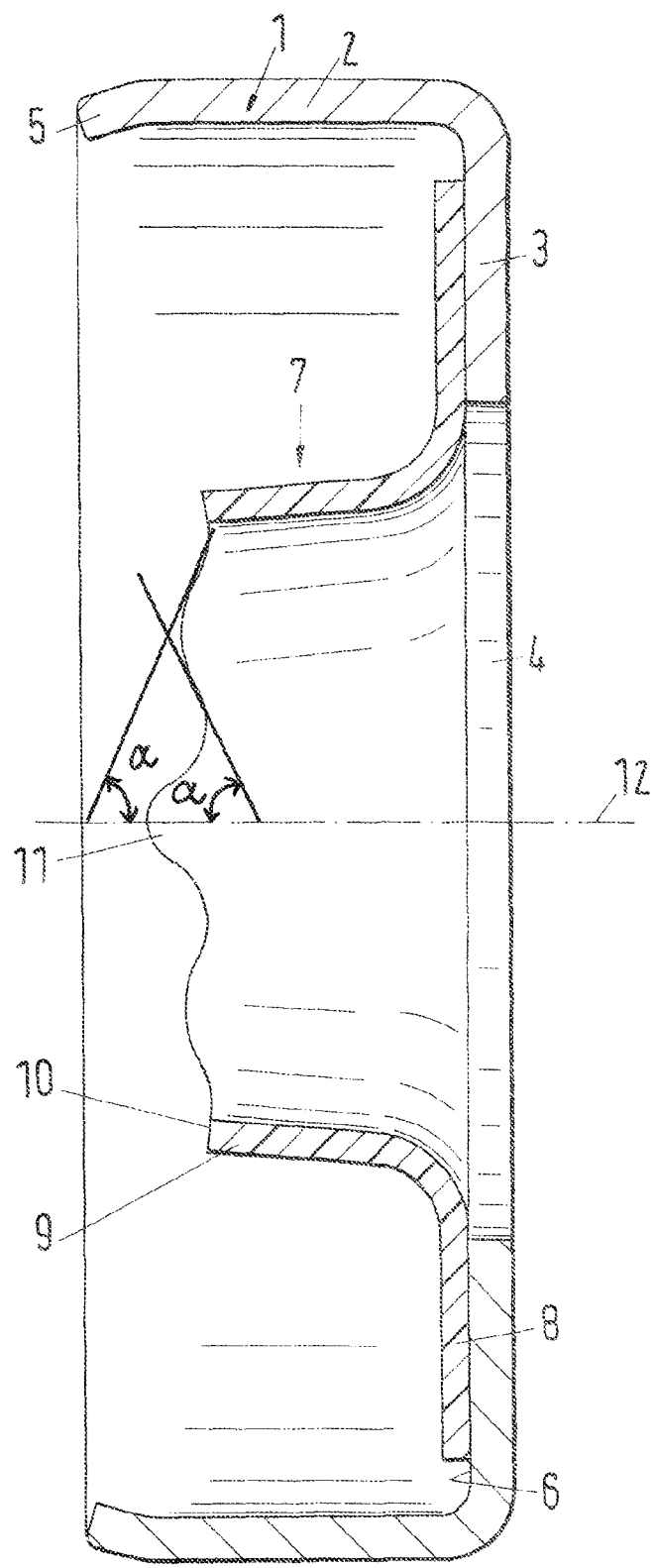
FIG. 1 shows in axial section a first embodiment of the sealing ring and FIG. 1a illustrates details of the sealing edge.

The sealing ring according to FIG. 1 comprises a housing 1 that is comprised of metallic material or of a hard plastic material. The housing 1 has a cylindrical outer wall 2 passing into a radially extending planar bottom 3. The cylindrical outer wall 2 and the bottom 3 have advantageously the same thickness. The bottom 3 is provided centrally with a through opening 4 for a shaft (not illustrated) to be sealed. The free end 5 of the cylindrical outer wall 2 can be positioned at a slant so as to point inwardly at an angle.

Figure 1A:
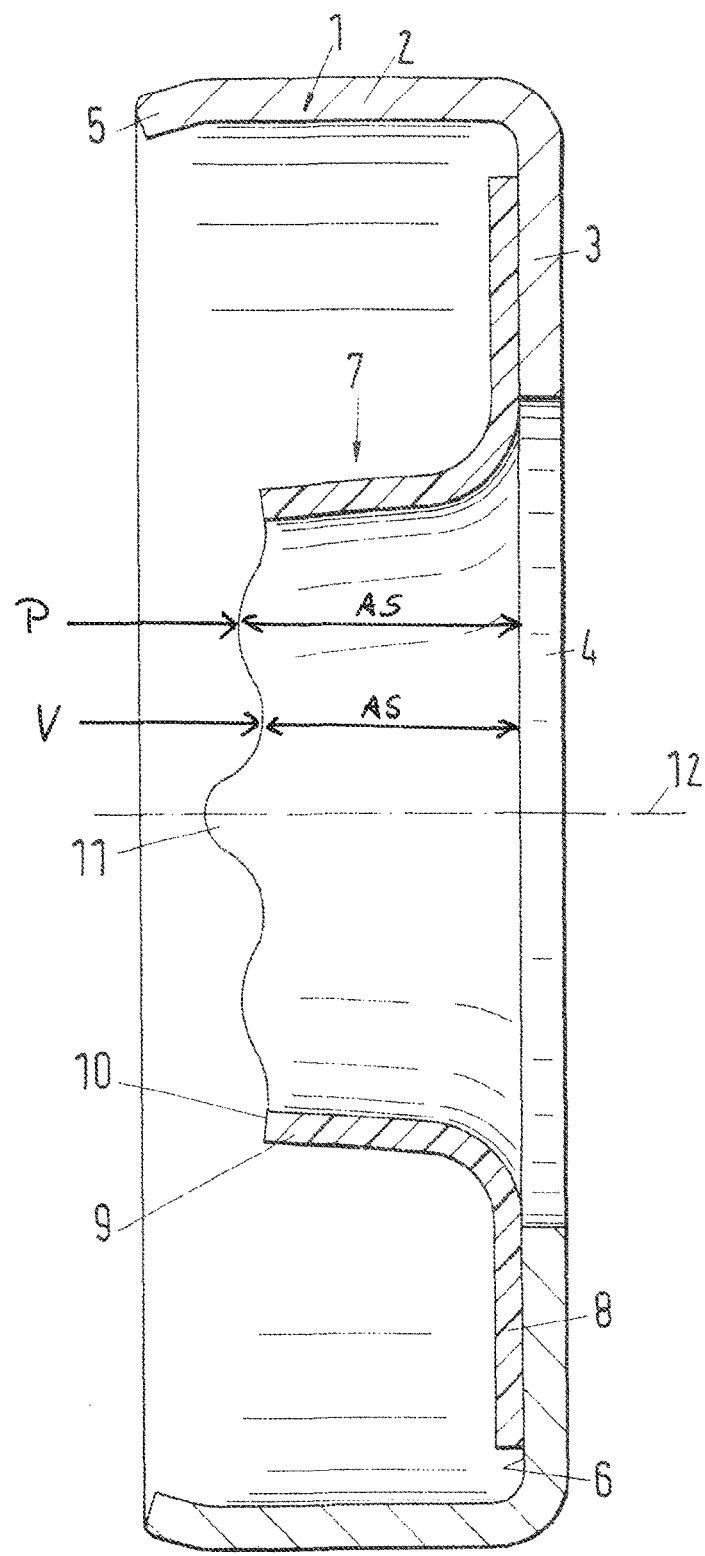

A sealing element 7 that is comprised of a suitable material such as rubber or, for example, polytetrafluoroethylene, is attached to the inner side 6 of the bottom 3. The sealing element 7 has an annular disk-shaped fastening part 8 that is attached to the inner side 6 of the housing bottom 3. The fastening part 8 passes into a sealing part 9 that is conically shaped so as to taper in the direction of its free end and that rests with the sealing edge 10 seal-tightly on the shaft. The sealing edge 10 extends about the circumference of the sealing part 9 in a wave or undulated shape with peaks P and valleys V formed by a change of the axial spacing AS of the sealing edge 10 relative to the fastening part about the circumference of the sealing edge 10 (see FIG. 1a). At least at one location of the circumference, the sealing edge 10 is designed such that a projecting tongue 11 is formed that projects axially farther than the other peaks P. The section of the sealing edge 10 that delimits the tongue 11 has a smaller radius of curvature than the remaining wave shaped portion of the sealing edge 10.

By means of the housing 1, the sealing ring is mounted in a mounting space or opening of a device. With the cylindrical outer wall 2 the housing is seated with press-fit in the mounting space or opening. The sealing element 7 is positioned with the wave-shaped sealing edge 10 seal-tightly on the shaft. In use, the shaft rotates relative to the sealing element 7. The wave-shaped sealing edge 10 ensures in this connection that a pumping action is generated on the medium to be sealed which pumping action ensures that medium that has leaked underneath the sealing edge 10 is returned into the medium chamber. The tongue 11 is especially effective in connection with the pumping action.

In deviation from the embodiment that is illustrated it is possible that the sealing edge 10 in the area outside of the tongue 11 is designed such that it is positioned in a radial plane of the sealing ring. In this case, the pumping action acting on the medium to be sealed is generated exclusively by the tongue 11. With an appropriate shaping of the tongue 11 the magnitude of the pumping action can be matched to the mounting conditions and/or to the medium to be sealed.

Advantageously, the sealing edge 10 is symmetric to the seal axis 12. When this is so, the pumping action has the same efficiency in both possible directions of rotation of the shaft.

Figure 2:
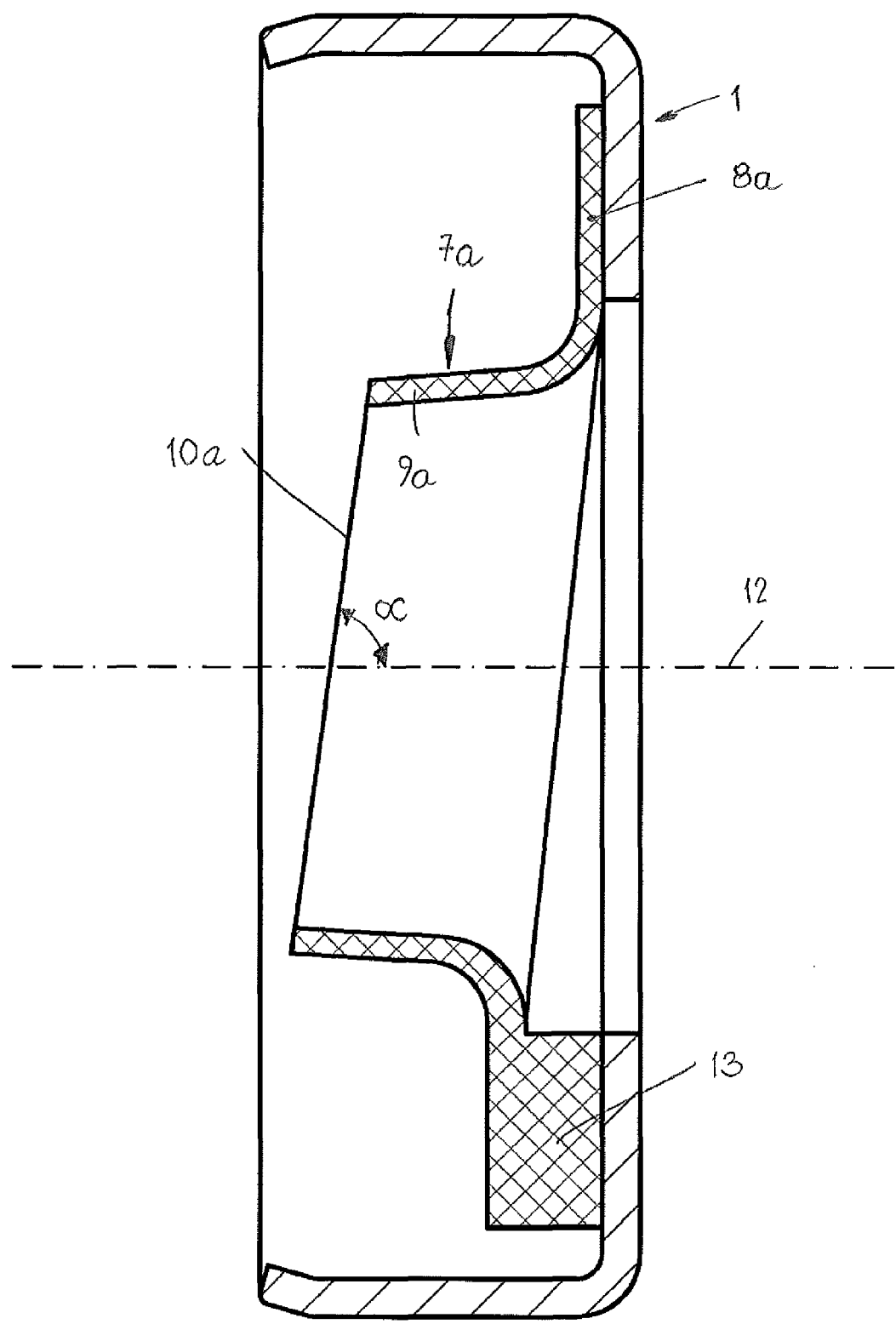
FIG. 2 shows in axial section a second embodiment of the sealing ring.

The sealing ring according to FIG. 2 has a housing 1 that is of the same configuration as in the preceding embodiment. The sealing element 7a comprises the fastening part 8a that is in the form of an annular disk and that passes into the sealing part 9a. The sealing edge 10a, formed in accordance with the preceding embodiment by the end face of the sealing part 9a, is positioned relative to the seal axis 12 at an angle deviating from 90 degrees, when viewed in a projection onto an axial plane of the sealing ring. In the shown embodiment, this slant angle $\alpha$ is approximately 80 degrees. In order to be able to provide in a simple way this slant angle, the fastening part 8a is provided about a portion of its circumference with a thicker portion 13 whose thickness is matched to the slant angle $\alpha$.

The thicker portion 13 passes in both circumferential directions continuously into the diametrically opposed thinner portion of the fastening part 8a.

Since the sealing edge 10a is positioned in a plane that is positioned at an angle α relative to the seal axis 12, the pumping action in use of the sealing ring acts in both rotational directions of the shaft to be sealed.

Figure 3:
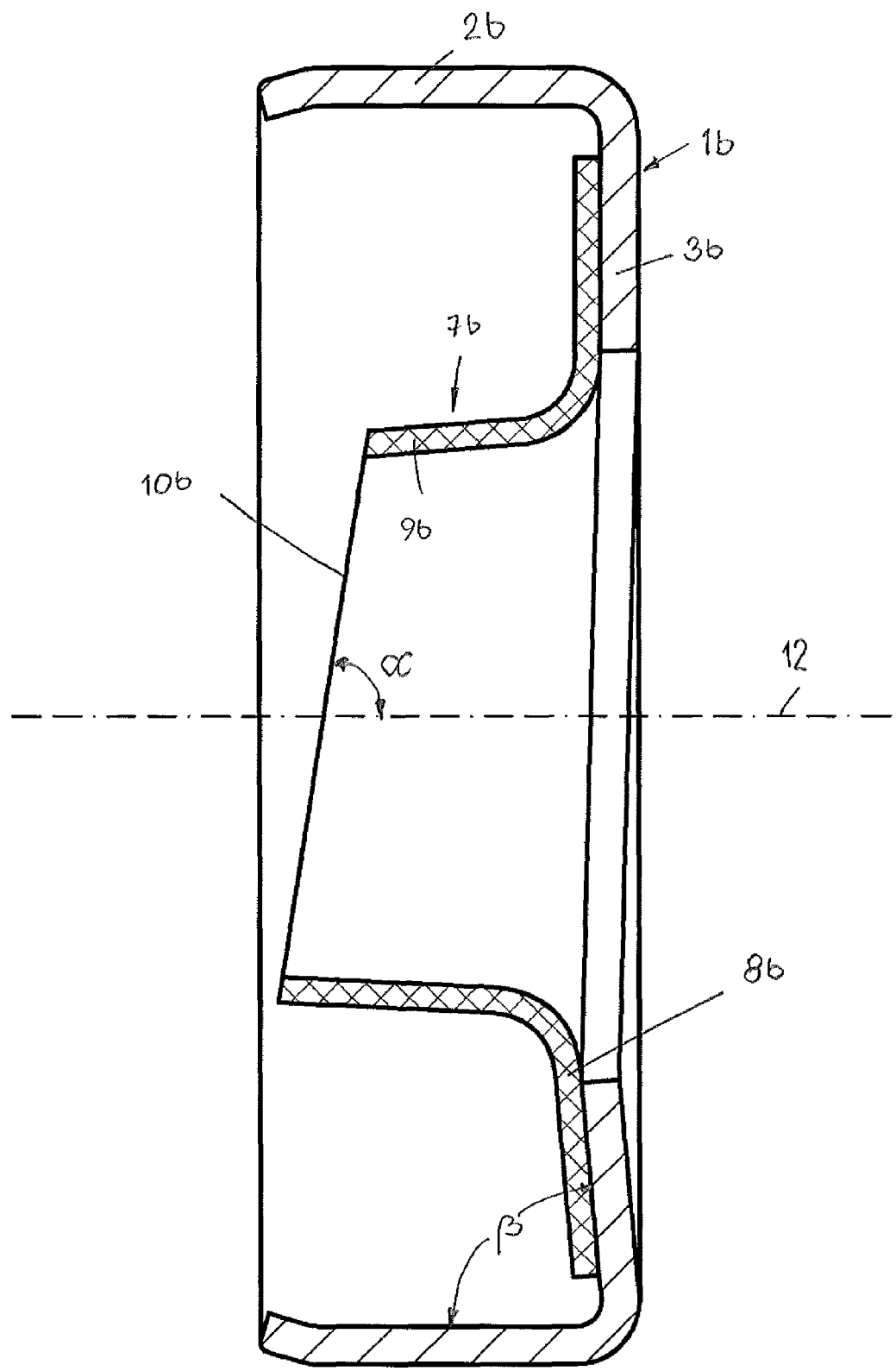
FIG. 3 shows in axial section a third embodiment of the sealing ring.

The sealing ring according to FIG. 3 has housing 1b with cylindrical outer wall 2b. It passes, as in the preceding embodiments, with a continuous curvature into the annular disk-shaped bottom 3b. In contrast to the two preceding embodiments, the bottom 3b is not positioned about its circumference in a radial plane of the sealing ring. Instead, the bottom 3b is angled inwardly across a part of its circumference. This angled bottom area is positioned relative to the cylindrical outer wall 2b at an acute angle β that in the shown embodiment is approximately 80 degrees. As a result of this slanted bottom part pointing inwardly, the fastening part 8b of the sealing element 7b does not have a thicker portion as the one shown in the sealing ring according to FIG. 2. The fastening part 7b and the sealing part 9b have the same thickness. The sealing edge 10 is again positioned in a plane that defines an acute angle α relative to the seal axis 12. As in the embodiment according to FIG. 2, this angle α is, for example, approximately 80 degrees.

Figure 4:
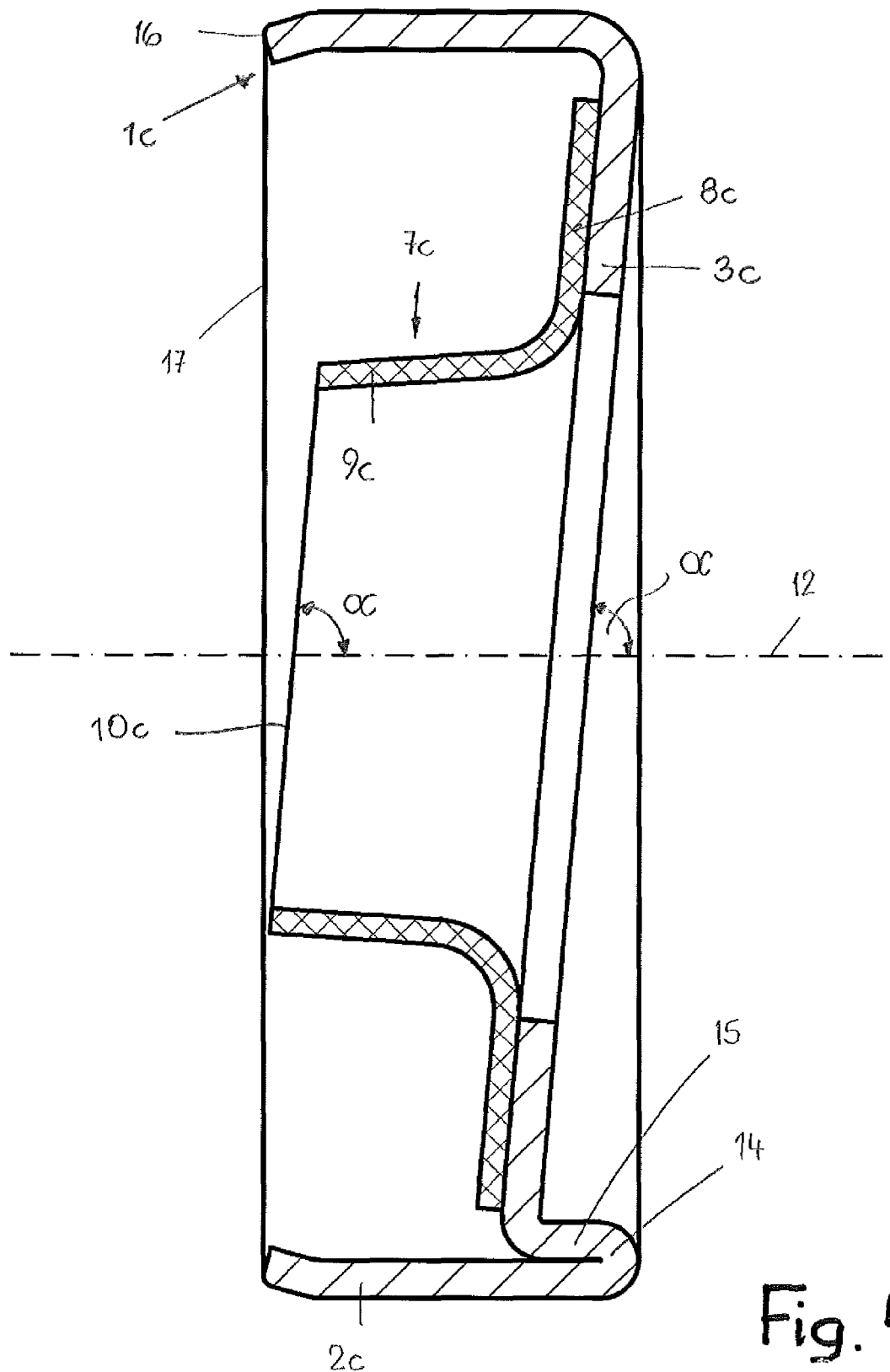
FIG. 4 shows in axial section a fourth embodiment of the sealing ring.

FIG. 4 shows a sealing ring whose, sealing element 7c is of rotational symmetry. It comprises sealing part 9c that passes in an arc shape into the annular disk-shaped fastening part 8c. By means of the latter, the sealing element 7c is attached to the bottom 3c of the housing 1c. The sealing edge 10c of the sealing element 7c is planar and is positioned in a plane that, relative to the seal axis 12, defines an acute angle α that is again in an exemplary fashion approximately 80 degrees. In order to achieve this slant angle of the sealing edge 10c, the bottom 3c relative to the seal axis 12 is positioned at a slant. The housing bottom 3c is positioned at the same acute slant angle α relative to the seal axis 12 as the sealing edge 10c. In order to achieve this slanted position of the bottom 3c, the transition from the cylindrical outer wall 2c into the bottom 3c is formed by a 180 degree crimped portion 14 extending about part of the circumference. The radially inwardly positioned crimped section 15 rests against the inner side of the cylindrical outer wall 2c. The axial width of the crimped section 15 decreases continuously in accordance with the slant angle about the circumference of the housing bottom 3c until the bottom 3c simply passes in an arc shape with a curved portion into the cylindrical outer wall 2c. This arc-shaped transition illustrated in FIG. 4 in the upper half, is provided in the area of the sealing ring in which the sealing edge 10c has the greatest spacing from the radial plane 17 in which the end face 16 of the cylindrical outer wall 2c is positioned. Accordingly, the crimped section 15 has its greatest axial length in the area (lower half of FIG. 4) in which the sealing edge 10c has the smallest spacing from the radial plane 17. In this embodiment, the sealing element 7c also has rotational symmetry so that a simple manufacture of the sealing element is ensured. In particular, no slanted cutting of the sealing element 7c is required in order to provide the slantedly positioned sealing edge 10c. The slanted position of the sealing edge 10c is effected simply by the shaping of the housing bottom 3c and this can be done in a simple way.

Figure 5:
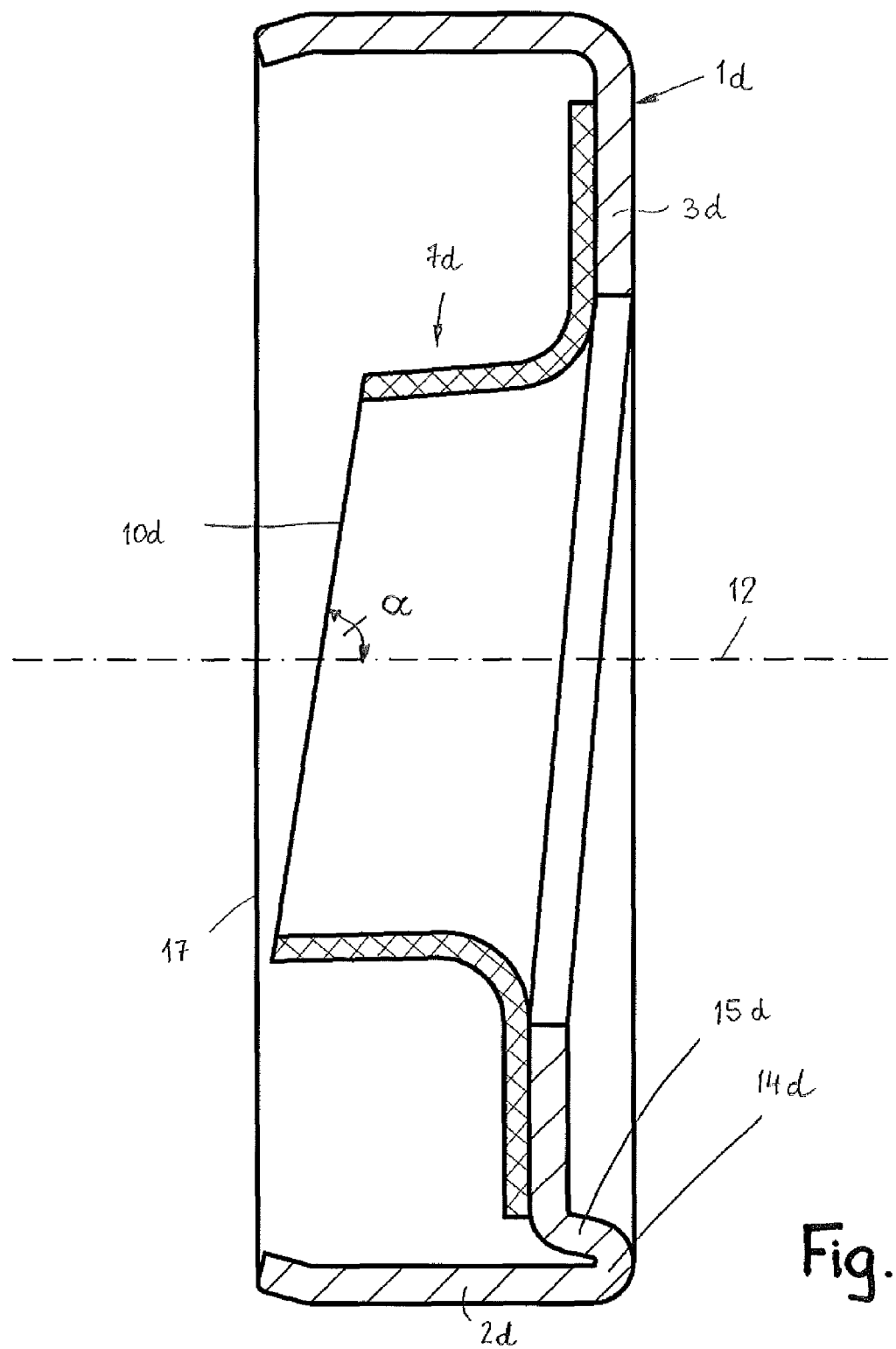
FIG. 5 shows in axial section a fifth embodiment of the sealing ring.

In the embodiment according to FIG. 5 the sealing edge 10d of the sealing element 7d is positioned in a plane that defines the acute angle α relative to the sealing axis 12. The sealing element 7d is of rotational symmetry and is brought into a position as shown in FIG. 5 when attached to the bottom 3d of the housing 1d. The bottom 3d has again a crimped part 14d whose radially inwardly positioned crimped section 15d in contrast to the preceding embodiment is positioned at an acute angle relative to the inner side of the cylindrical outer wall 2d of the housing 1d. The axial length of the crimped section 15 decreases from a maximum length continuously about the circumference of the annular disk-shaped bottom 3d until the cylindrical outer wall 2d passes at a continuous curvature into the radial section of the bottom 3d (upper half in FIG. 5). The crimping section 15d has its greatest axial length, viewed in cross-section, in the area in which the sealing edge 10d has the smallest spacing from the radial plane 17 of the housing 1d. In the area in which the sealing edge 10d has its greatest spacing from the radial plane 17, no crimping section is present so that the bottom 3d in this area extends radially and passes with a continuous curvature into the cylindrical outer wall 2d. The entire bottom 3d is shaped such that the bottom sections, in the circumferential direction, extend parallel to one another. In the preceding embodiment, the entire bottom 3c is instead slanted at an angle α relative to the seal axis 12.

Figure 6:
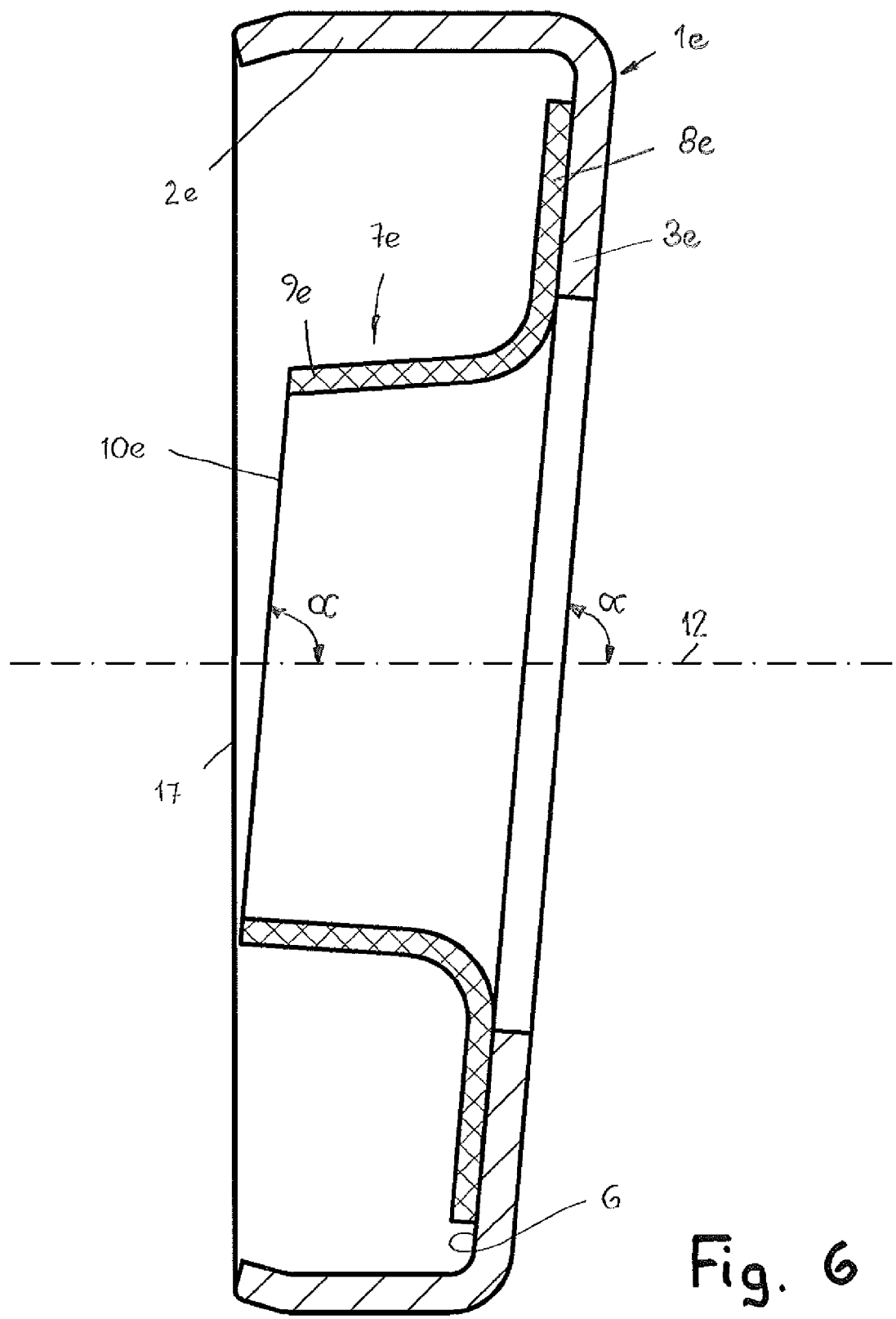
FIG. 6 shows in axial section a sixth embodiment of the sealing ring.

The sealing ring according to FIG. 6 has a sealing element 7e of rotational symmetry that comprises sealing part 9e and planar, annular disk-shaped fastening part 8e. The slanted position of the sealing edge 10e is achieved in that the bottom 3e of the housing 1e extends at a slanted to the seal axis 12. This has the result that the cylindrical outer wall 2e does not have a constant height about the circumference. In the area in which the sealing edge 10e has the smallest distance from the radial plane 17, the cylindrical outer wall 2e has the smallest height (lower half in FIG. 6). In the area in which the sealing edge 10e has the greatest axial spacing from the radial plane 17, the cylindrical outer wall 2e has therefore the greatest height (upper half of FIG. 6). The bottom 3e of the housing 1e is also planar and positioned at an acute slant angle α relative to the seal axis 12; this angle is identical to the slant angle α at which the sealing edge 10e is positioned relative to the seal axis 12. The housing 1e with the slantedly positioned planar bottom 3 can be manufactured in a simple way. For slantedly positioning the sealing edge, the sealing element 7e must not be cut at a slant but simply attached by means of fastening part 8e to the inner side 6 of the bottom 3e in a suitable way.

Figure 7:
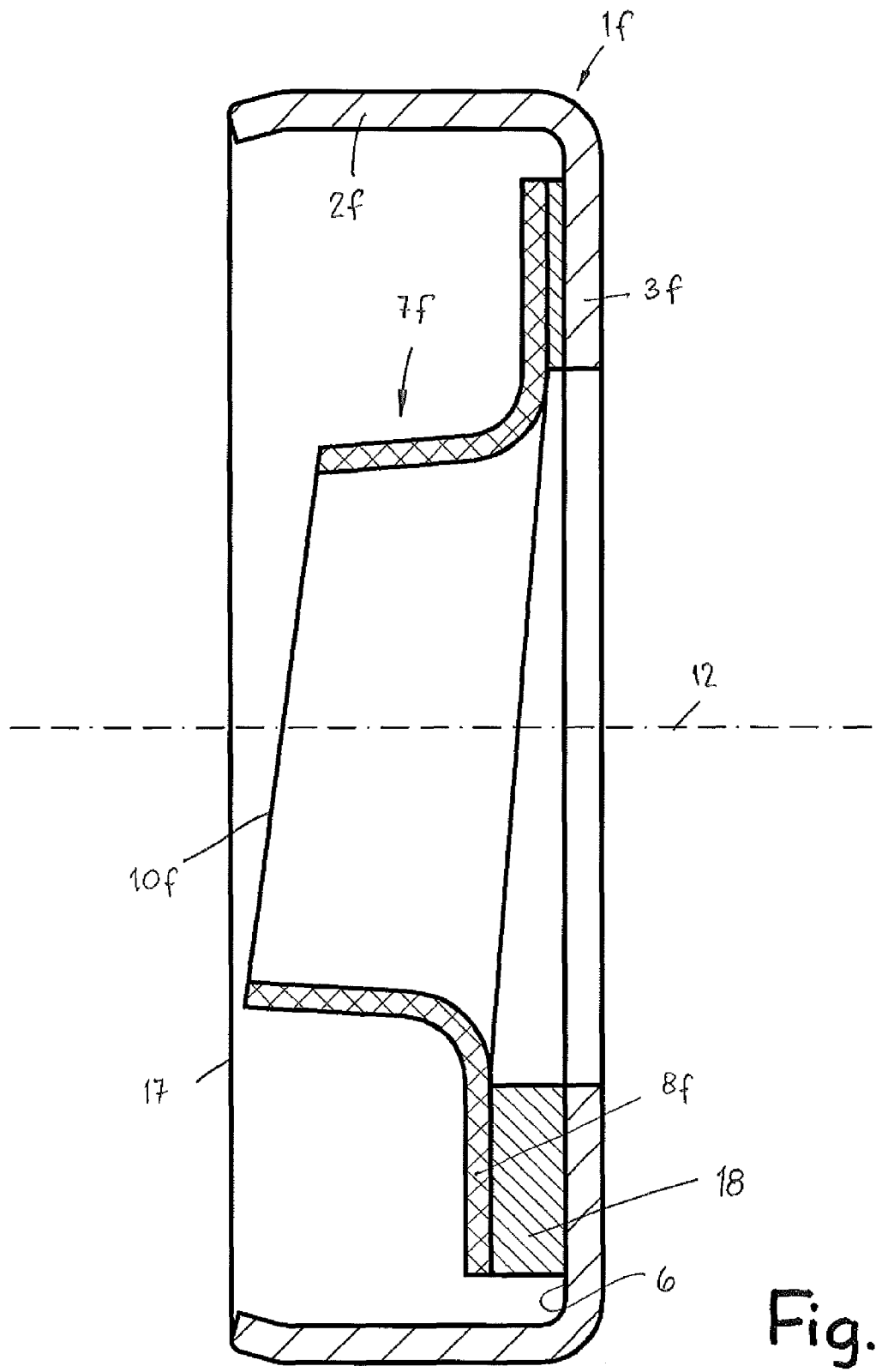
FIG. 7 shows in axial section a seventh embodiment of the sealing ring.

The embodiment according to FIG. 7 is similar to the embodiment according to FIG. 2. The slanted position of the sealing element 7f is achieved in that it is attached by means of a washer 18 to the inner side 6 of the planar bottom 3f of the housing 1f. The annular disk-shaped bottom 3f extends perpendicularly to the seal axis 12 and passes with a continuous curvature into the cylindrical outer wall 2f. The washer 18 has a varying thickness about its circumference wherein the change in thickness about the circumference is realized continuously. In the area in which the sealing edge 10f of the sealing element 7f has the smallest distance from the radial plane 17, the washer 18 has its greatest thickness. It decreases in the direction of the diametrically opposed area of the washer 18 that has its minimal thickness where the sealing edge 10f has the greatest distance from the radial plane 17. The washer 18 is designed about its circumference in such a way that the sealing edge 10f has the desired slant angle relative to the seal axis 12. The washer 18 has the same inner diameter as the bottom 3f of the housing 1f. The washer 18 is attached in a suitable way on the inner side 6 of the housing bottom 3f, for example, by an adhesive. The sealing element 7f, in turn, is fastened with its annular disk-shaped fastening part 8f on the washer 18 in a suitable way. The washer 18 can be made from any suitable material, for example, metallic material or plastic material. The sealing element 7f is also advantageously of rotational symmetry. In order to achieve the slanted position of the sealing edge 10f, a slanted cutting of the sealing element is not required so that the sealing ring can be produced in a simple way.

In the described embodiments, the slanted position of the sealing edge 10 to 10f relative to the seal axis 12 achieves that medium to be sealed that has leaked underneath the sealing edge is returned reliably upon rotation of the shaft to be sealed, independent of the direction of rotation of the shaft. The slanted position or the slant angle α can be selected as the function of the design of the mounting space, of the medium to be sealed, as a function of the design of the housing and the like. The sealing ring is pressed with its housing into the mounting space. In this connection, the cylindrical outer wall of the housing can be provided with a static seal, for example, in the form of an elastomer coating.

The sealing rings can also be designed such that they have no housing. In this case, the sealing elements are attached without housing directly in the mounting space wherein the slanted position of the sealing edge is achieved by an appropriate design of the mounting space and/or of the sealing element.

The specification incorporates by reference the entire disclosure of German priority document 10 2007 045 043.7 having a filing date of Sep. 13, 2007.

While specific embodiments of the invention have been shown and described in detail to illustrate the inventive principles, it will be understood that the invention may be embodied otherwise without departing from such principles.

What is claimed is:

1. A sealing ring comprising:
    a sealing element comprising at least one fastening part and at least one sealing part provided with a sealing edge at an end remote from the fastening part;
    wherein the sealing element is essentially of rotational symmetry and has a seal axis;
    wherein the sealing part projects axially away from the fastening part and the sealing edge is axially spaced at an axial spacing from the fastening part;
    wherein the sealing edge has an undulated shape about a circumference thereof such that the sealing edge is positioned in changing slanted positions about the circumference relative to the seal axis at an angle different from a 90 degree angle, viewed in a projection onto an axial plane of the sealing ring;
    wherein the axial spacing of the sealing edge relative to the fastening part changes in the circumferential direction so that valleys and peaks are formed, wherein at least one of the peaks projects axially past the other axial peaks and forms an axially projecting tongue.

2. The sealing ring according to claim 1, wherein the at least one sealing part is conically shaped.

3. The sealing ring according to claim 1, wherein the at least one sealing part has an axial length that changes in a circumferential direction of the at least one sealing part.

4. The sealing ring according to claim 1, wherein the at least one fastening part passes with a continuous curvature into the at least one sealing part.

5. The sealing ring according to claim 1, wherein at least one fastening part has a shape of an annular disk.

* * * * *